(12) United States Patent
Liu et al.

(10) Patent No.: US 11,578,753 B2
(45) Date of Patent: Feb. 14, 2023

(54) BEARING SUPPORTING ASSEMBLY AND MACHINING METHOD THEREOF, AND CENTRIFUGAL COMPRESSOR

(71) Applicant: Gree Electric Appliances, Inc. of Zhuhai, Guangdong (CN)

(72) Inventors: Hua Liu, Guangdong (CN); Zhiping Zhang, Guangdong (CN); Hongbo Li, Guangdong (CN); Ruixing Zhong, Guangdong (CN); Yuhui Chen, Guangdong (CN); Wenteng Ye, Guangdong (CN); Jingli Qi, Guangdong (CN); Sheng Liu, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 0 days.

(21) Appl. No.: 17/289,077

(22) PCT Filed: Oct. 24, 2019

(86) PCT No.: PCT/CN2019/112945
§ 371 (c)(1),
(2) Date: Apr. 27, 2021

(87) PCT Pub. No.: WO2020/134430
PCT Pub. Date: Jul. 2, 2020

(65) Prior Publication Data
US 2022/0010812 A1    Jan. 13, 2022

(30) Foreign Application Priority Data
Dec. 25, 2018  (CN) .......................... 201811595311.1

(51) Int. Cl.
*F16C 17/10* (2006.01)
*F04D 29/046* (2006.01)
*F16C 35/02* (2006.01)

(52) U.S. Cl.
CPC .......... *F16C 17/107* (2013.01); *F04D 29/046* (2013.01); *F16C 17/10* (2013.01);
(Continued)

(58) Field of Classification Search
CPC ........ F16C 17/10; F16C 17/107; F16C 35/02; F05D 2240/52; F05D 2240/53;
(Continued)

(56) References Cited

U.S. PATENT DOCUMENTS 5,887,983 A * 3/1999 Gulian .................... F16C 35/02
                                                        384/296
6,126,414 A * 10/2000 Koike ...................... F16C 17/04
                                                        417/407
(Continued)

FOREIGN PATENT DOCUMENTS

CN         2206852 Y      9/1995
CN         1462840 A      12/2003
(Continued)

*Primary Examiner* — James Pilkington
(74) *Attorney, Agent, or Firm* — The Webb Law Firm

(57) ABSTRACT

The present disclosure relates to a bearing supporting assembly and a machining method thereof, and a centrifugal compressor. The bearing supporting assembly includes: bearing supports, provided with through holes for mounting radial bearings; and a fixing plate, detachably mounted at one end of each of the bearing supports along an axial direction, sides, away from the bearing supports, of the fixing plates being configured to mount first thrust bearings.

15 Claims, 3 Drawing Sheets

(52) U.S. Cl.
CPC .......... *F16C 35/02* (2013.01); *F05D 2240/52* (2013.01); *F05D 2240/53* (2013.01); *F05D 2240/54* (2013.01)

(58) Field of Classification Search
CPC .. F05D 2240/54; F04D 29/046; F04D 29/047; F04D 29/05; F04D 29/051; F04D 29/0513
See application file for complete search history.

(56) References Cited

U.S. PATENT DOCUMENTS

| | | |
|---|---|---|
| 7,401,979 B2 | 7/2008 | Ando et al. |
| 9,790,950 B2 * | 10/2017 | Uneura ................. F04D 29/051 |
| 9,903,226 B2 * | 2/2018 | Uneura ................. F01D 25/186 |
| 2003/0108260 A1 | 6/2003 | Chuang |
| 2004/0005228 A1 | 1/2004 | Agrawal et al. |
| 2004/0179947 A1 | 9/2004 | Agrawal et al. |
| 2007/0154124 A1 | 7/2007 | Inoue et al. |
| 2014/0356123 A1 | 12/2014 | Gerber et al. |
| 2015/0078884 A1 | 3/2015 | Uneura et al. |

FOREIGN PATENT DOCUMENTS

| | | | |
|---|---|---|---|
| CN | 1766356 A | | 5/2006 |
| CN | 209340164 | * | 9/2019 |
| CN | 209340195 | * | 9/2019 |
| CN | 209340197 | * | 9/2019 |
| DE | 102015007379 A1 | | 1/2016 |
| DE | 102016215638 A1 | | 2/2018 |
| JP | 2000337292 A | | 12/2000 |

* cited by examiner

BEARING SUPPORTING ASSEMBLY AND MACHINING METHOD THEREOF, AND CENTRIFUGAL COMPRESSOR

CROSS-REFERENCE TO RELATED APPLICATIONS

The present application is a National Stage of International Application No. PCT/CN2019/112945 filed on Oct. 24, 2019, which claims the priority of the Chinese patent application No. 201811595311.1, entitled "BEARING SUPPORTING ASSEMBLY AND MACHINING METHOD THEREOF, AND CENTRIFUGAL COMPRESSOR" and filed on Dec. 25, 2018, both of which are incorporated herein by reference in their entireties.

BACKGROUND OF THE DISCLOSURE

Field of the Disclosure

The present disclosure relates to a bearing supporting assembly and a machining method thereof, and a centrifugal compressor.

Description of Related Art

A dynamic pressure gas bearing has the advantages of high precision, low friction loss, long life, low vibration, no pollution and no need of providing a lubricating medium, etc. Meanwhile, the dynamic pressure gas bearing is suitable for occasions with high rotating speed and high precision, and has a wide application prospect in centrifugal compressors, especially small compressors. However, during use of the dynamic pressure bearing, due to low gas viscosity and no external gas supply for the dynamic pressure gas bearing, bearing capacity is low. The bearing clearance is generally micron or tens of microns, so high machining and assembling precision is required. These characteristics of the dynamic pressure bearing put forward high requirements on the design of bearing supports.

SUMMARY OF THE DISCLOSURE

One aspect of embodiments of the present disclosure provides a bearing supporting assembly, including:
a bearing support, provided with a through hole;
a fixing plate, detachably mounted at one end of the bearing support along an axial direction of the through hole;
a radial bearing, mounted in the through hole; and
a first thrust bearing, mounted on a side, away from the bearing support, of the fixing plate.

In some embodiments, the fixing plate is configured to limit a displacement of the radial bearing along the axial direction.

In some embodiments, a locating ring is arranged at one end, facing towards the bearing support, of the fixing plate, the bearing support is provided with an annular first groove, the locating ring is arranged into first groove, and an inner wall of the locating ring engages with an outer wall of a partial length section of the radial bearing.

In some embodiments, the bearing supporting assembly further includes a shell, wherein a first end of the bearing support is connected to the fixing plate, a second end of bearing support is connected to the shell, and radial outline dimensions of the bearing support gradually increase from the first end to the second end thereof.

In some embodiments, the bearing supporting assembly further includes a shell, wherein a spigot is formed at one end, connected to the shell, of the bearing support, and is configured to perform first location on connection between the bearing support and the shell.

In some embodiments, the bearing supporting assembly further includes a pin, configured to perform second location on connection between the bearing support and the shell.

In some embodiments, the bearing support is provided with a vent hole configured to communicate a space where the radial bearing is located with a space where the first thrust bearing is located.

Another aspect of embodiments of the present disclosure provides a centrifugal compressor, including the bearing supporting assembly according to the above embodiments.

In some embodiments, the centrifugal compressor further includes: a main shaft, a diffuser, a thrust disk and a second thrust bearing, wherein thrust disk is configured to rotate together with shaft and is located between the diffuser and the fixing plate along axial direction; and
the first thrust bearing is arranged at one end, away from the bearing support, of the fixing plate, and the second thrust bearing is arranged at one end, close to the fixing plate, of the diffuser.

In some embodiments, wherein a clearance between one side of the thrust disk and the first thrust bearing and a clearance between the other side of the thrust disk and the second thrust bearing are limited through mutual abutting of the diffuser and the fixing plate.

In some embodiments, a second groove is formed at one end, close to the fixing plate, of the diffuser, the second thrust bearing is arranged at the bottom of the first groove along the axial direction, the fixing plate and the diffuser are fixed, and the thrust disk is located in the second groove.

In some embodiments, at least one of the first thrust bearing, the second thrust bearing and the radial bearing is an air-suspending bearing.

Yet another aspect of embodiments of the present disclosure provides a machining method of the bearing supporting assembly based on the above embodiments. The machining method includes:
assembling the bearing support and the shell into a combined body;
locating and clamping the combined body on machining equipment; and
machining the through hole of the bearing support and an end face for mounting the fixing plate to a preset size through one-time location and clamping.

In some embodiments, two bearing supports are arranged in the shell at intervals along the axial direction are arranged in the shell; and after the two bearing supports and the shell are assembled into the combined body, machining the through holes of the bearing supports includes:
machining the through holes of the two bearing supports to the preset size through one-time location and clamping.

In some embodiments, the step of machining the through holes of the two bearing supports to a preset size through one-time location and clamping specifically includes:
sequentially machining the through holes of the two bearing supports to the preset size from one side of the shell.

In some embodiments, a spigot is formed at one end, connected to the shell, of the bearing support; and the step of assembling the bearing support and the shell into the combined body specifically includes:
assembling the bearing support and the shell through the spigot to perform first location;

fixing the bearing support and the shell through a fastener; and after fixing a flange disk of the bearing support and the shell, punching a pin to perform second location.

In some embodiments, after machining, the machining method further includes:

disassembling the combined body formed by assembling the bearing support and the shell so as to mount the radial bearing in a state where the bearing support is separated from the shell.

BRIEF DESCRIPTION OF THE DRAWINGS

The accompanying drawings are used to provide further understanding of the present disclosure and constitute a part of the present disclosure. The exemplary embodiments of the present disclosure and the description thereof serve to explain the present disclosure, but do not constitute an improper limitation to the present disclosure. In the accompanying drawings.

DETAILED DESCRIPTION

The present disclosure is described hereinafter in detail. In the following paragraphs, different aspects of embodiments are defined in detail. The aspects defined may be combined with one or more of any other aspects unless it is explicitly pointed that they cannot be combined. In particular, any features considered to be preferred or favorable may be combined with one or more of other features considered to be preferred or favorable combination.

The terms "first", "second" and the like appearing in the present disclosure are only used to facilitate description so as to distinguish different components with the same name, but not to represent a sequence or a primary and secondary relationship.

Figure 1:
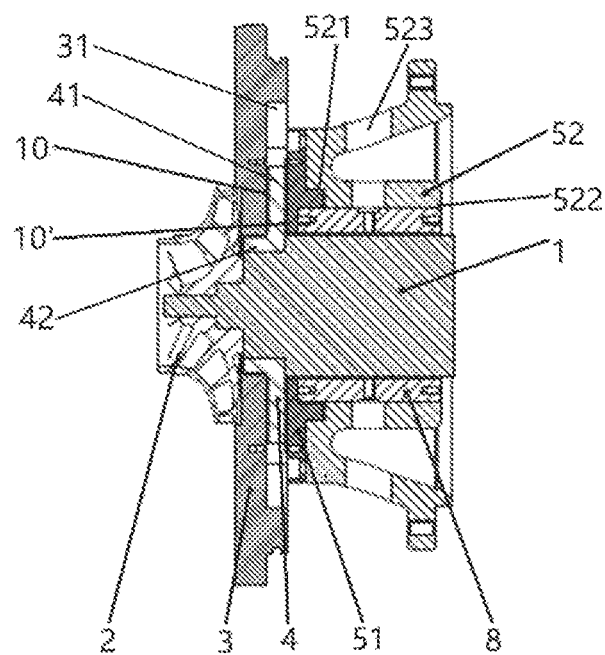
FIG. 1 is a schematic diagram of a local structure of some embodiments of a centrifugal compressor according to the present disclosure.

To clearly describe each azimuth in the following embodiments, an azimuth or position relationship indicated by terms "upper", "lower", "top", "bottom", "front", "rear", "inner", "outer" and the like is described only for facilitating the description of the present disclosure, but not for indicating or implying that the referred device must have a specific azimuth and perform construction and operation in the specific azimuth; therefore, it cannot be interpreted as a limitation to the protection scope of the present disclosure. Furthermore, as shown in FIG. 1, "axial direction", "circumferential direction" and "radial direction" mentioned hereafter are all defined on the basis of a main shaft 1.

An embodiment of the present disclosure provides a bearing supporting assembly and a machining method thereof, and a compressor, thus improving the assembling precision of a bearing.

As shown in FIG. 1 to FIG. 5, the present disclosure provides a bearing supporting assembly. In some embodiments, the bearing supporting assembly includes a fixing plate 51, a bearing support 52, a radial bearing 8 and a first thrust bearing 10', wherein the bearing support 52 is provided with a through hole 522 for mounting the radial bearing 8; and the fixing plate 51 is detachably mounted at one end of the bearing support 52 along an axial direction of the through hole 522, and a side, away from the bearing support 52, of the fixing plate 51 is configured to mount the first thrust bearing 10'. For example, the fixing plate 51 is mounted on the bearing support 52 through a fastener.

Figure 3:
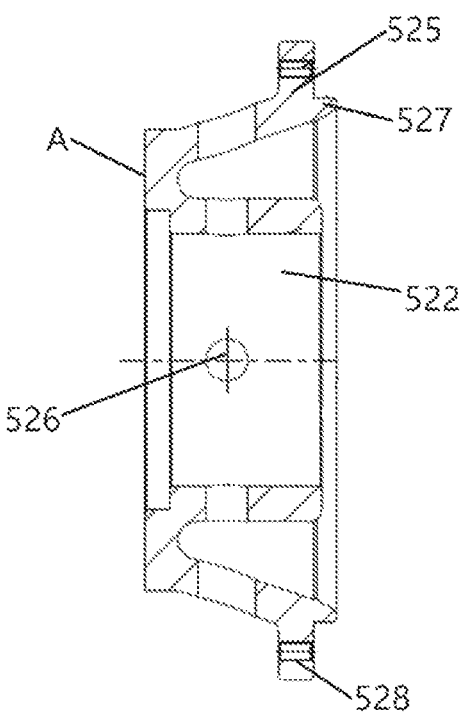
FIG. 3 is a schematic structural diagram of some embodiments of a bearing support in a bearing supporting assembly according to the present disclosure.
Figure 4:
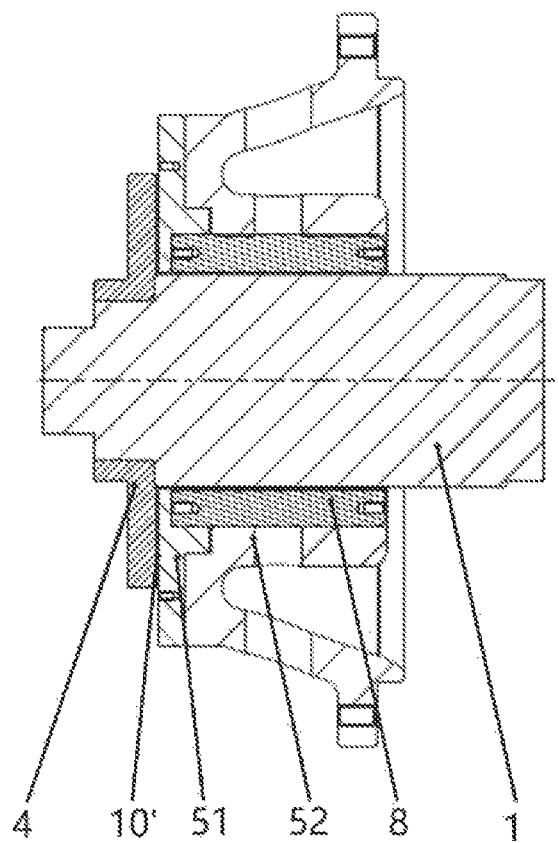
FIG. 4 is a schematic structural diagram of some embodiments of a bearing supporting assembly according to the present disclosure.

As shown in FIG. 3, since the through hole 522 of the bearing support 52 is configured to mount the radial bearing 8 and an end face A is configured to mount the fixing plate 51, a mounting perpendicularity of the fixing plate 51 relative to the axial direction of the through hole 522 will be affected, thus affecting a mounting perpendicularity of the first thrust bearing 10' and the radial bearing 8. In the embodiment, the fixing plate 51 and the bearing support 52 adopt a split structure, such that a perpendicularity relationship of the through holes 522 and the end faces A for mounting the fixing plates 51 is ensured during machining; furthermore, when two radial bearings 8 are provided, the coaxiality of the through holes 522 corresponding to the two bearing supports 52 is ensured, thus ensuring the coaxiality of the two radial bearings 8. Therefore, according to the bearing supporting assembly, the assembling precision of the bearing can be improved by ensuring the machining precision, such that the stability of a bearing rotor system is improved; furthermore, the qualification rate of part machining can be increased and the machining cost is reduced.

As shown in FIG. 1, the fixing plate 51 is further configured to limit a displacement of the radial bearing 8 moving towards the fixing plate 51 along the axial direction. Therefore, the fixing plate 51 is capable of mounting the first thrust bearing 10' and also capable of axially limiting the radial bearing 8, such that the structure of the bearing supporting assembly may be more compact, and it is beneficial to ensure a parallelism of a mounting surface of the first thrust bearing 10' and an axial limiting surface of the radial bearing 8 through a machining parallelism of two sides of the fixing plate 51, thus improving the mounting precision of the first thrust bearing 10' and the radial bearing 8.

Figure 2:
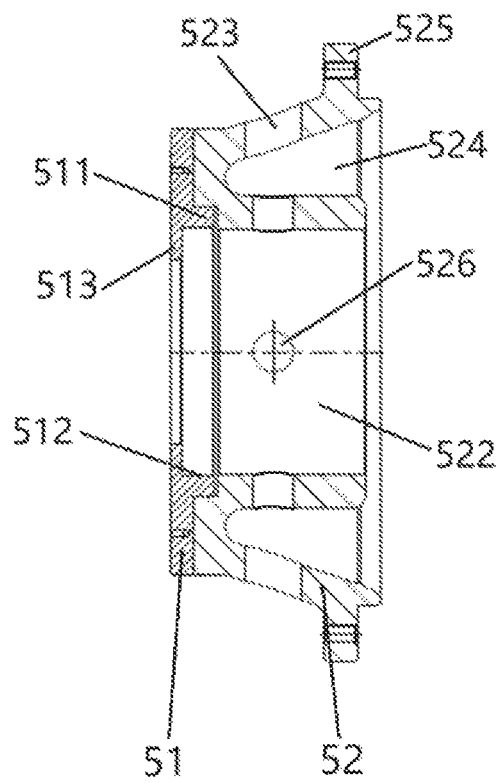
FIG. 2 is a schematic diagram of a combined structure of a fixing plate and a bearing support in a bearing supporting assembly according to the present disclosure.

As shown in FIG. 2, a locating ring 511 is arranged at one end, facing towards the bearing support 52, of the fixing plate 51, for example, the locating ring 511 and the fixing plate 51 are designed into an integral structure. An annular first groove 521 is formed in the bearing support 52, the locating ring 511 is arranged into the first groove 521 to radially locate the fixing plate 51, and there is a clearance between the fixing plate 51 and the main shaft 1. Furthermore, an inner wall 512 of the locating ring 511 engages with an outer wall of a partial length section of the radial bearing 8 for supporting the partial length section of the radial bearing 8, and plays an axial thrust role in the radial bearing 8. To realize axial thrust, a hole matched with the radial bearing 8 in the fixing plate 51 is formed along a partial thickness of the fixing plate 51, and a thrust platform 513 is reserved at one end away from the bearing support 52.

Figure 5:
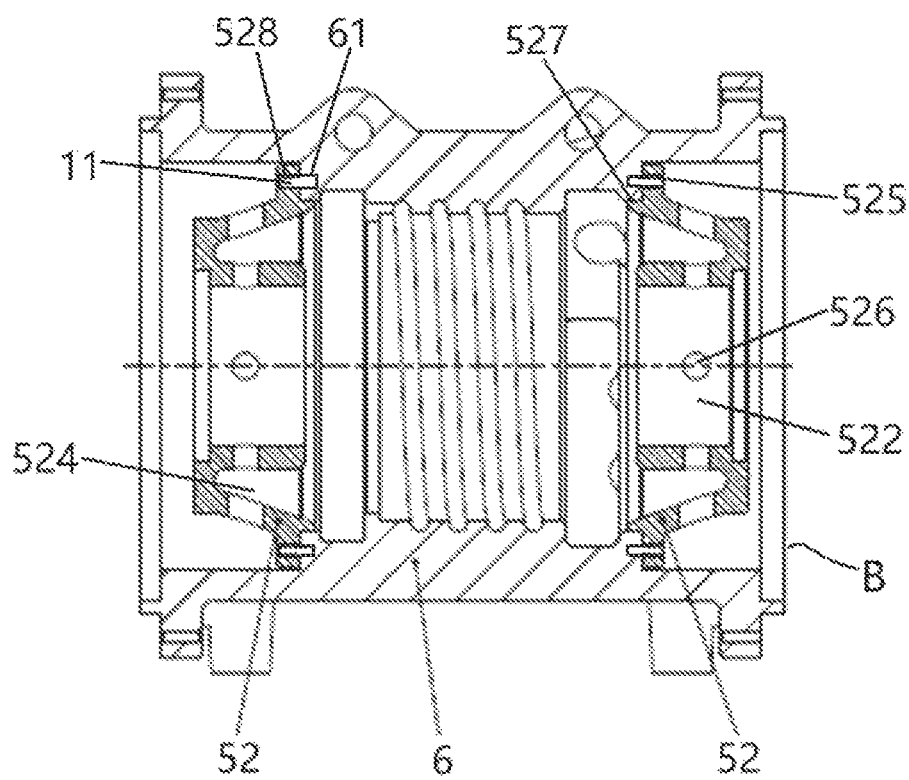
FIG. 5 is a schematic structural diagram of combined machining of some embodiments of a bearing supporting assembly according to the present disclosure.

As shown in FIG. 2 and FIG. 5, the bearing supporting assembly provided by the present disclosure further includes a shell 6, wherein a first end of the bearing support 52 along an axial direction is connected to the fixing plate 51, and a second end of the bearing support 52 is connected to the shell 6. Since an outer diameter of the first thrust bearing 10' is less than an inner diameter of the shell 6, accordingly, radial outline dimensions of the bearing support 52 in a longitudinal section gradually increase from the first end to the second end thereof.

To reduce weight, as shown in FIG. 2, a weight-reducing groove 524 is formed in one side, away from the fixing plate 51, of the bearing support 52, for example, the weight-reducing groove 524 is arranged annularly, an inner side wall of the weight-reducing groove 524 is parallel to an inner wall of the through hole 522, and an outer side wall of the weight-reducing groove 524 is consistent with an overall shape of the bearing support 52.

The V-shaped bearing support 52 adopts a structure with gradually varied cross sectional area, such that the overall structural strength of the bearing support 52 may be improved, stress in all places is distributed uniformly and the bearing capacity may be optimized; moreover, an external contour of the bearing support 52 is an inclined surface which is easily realized by casting, and has a draft angle when being cast by a mold.

In some embodiments, as shown in FIG. 2, the bearing support 52 is provided with a vent hole 526 configured to communicate a space where the radial bearing 8 is located with a space where the first thrust bearing 10' is located, such that the working environment of the radial bearing 8 is consistent with that of the first thrust bearing 10', for example, the working back pressure and temperature of the radial bearing 8 are consistent with those of the first thrust bearing 10'. A refrigerant for cooling a motor enters and exits a motor cavity. When the compressor operates normally, pressure and temperature in the motor cavity are stable, the working environment of the thrust bearing and the radial bearing 8 is as same as that of the motor cavity, that is, gas circulation is ensured, a back pressure is relatively stable, and fluctuation of a bearing gas film is reduced, thus improving the performance of the bearing.

As shown in FIG. 3, the bearing support 52 is provided with an operating hole 523 along a radial direction, such that a vibration sensor or a temperature sensor is mounted on an outer wall of the radial bearing 8 through the operating hole 523, to monitor the working state of the radial bearing 8. A hole section of the operating hole 523 along a radial outer side serves as a bypass hole so as to ensure that the pressure and temperature of the thrust bearing and the radial bearing 8 are as same as those of the motor cavity; and a hole section of the operating hole 523 along a radial inner side serves to dissipate heat for the radial bearing 8.

In some embodiments, as shown in FIG. 3 and FIG. 5, a flange disk 525 is arranged at a second end of the bearing support 52; a spigot 527 is formed in an end, away from the fixing plate 51, of the flange disk 525; the bearing support 52 is mounted in the shell 6 through the flange disk 525 and is fixed together with the shell 6 through a fastener 11'; meanwhile, the bearing support 52 is radially located through the spigot 527 and is axially located by depending on the end part, away from the fixing plate 51, of the flange disk 525.

The spigot 527 is configured to perform first location on connection between the bearing support 52 and the shell 6, such that a mounting position relationship between the bearing support 52 and the shell 6 can be primarily located. In some embodiments, the bearing supporting assembly further includes a pin 11, wherein the flange disk 525 of the bearing support 52 is provided with a first pin hole 528, the shell 6 is provided with a second pin hole 61, and the pin 11 penetrates into the first pin hole 528 and the second pin hole 61, so as to perform second location on connection between the bearing support 52 and the shell 6, thus accurately locating a mounting position relationship between the bearing support 52 and the shell 6. The pin 11 is arranged axially or is arranged radially.

According to the embodiment, the mounting precision of the bearing support 52 in the shell 6 may be accurately ensured through double location, such that the position precision between the radial bearing 8 and the thrust bearing is improved.

As shown in FIG. 3 and FIG. 5, the bearing support 52 is arranged in the shell 6, the through hole 522 of the bearing support 52 and the end face A for mounting the fixing plate 51 are configured to be machined to a preset size in a state where the bearing support 52 and the shell 6 are assembled into a combined body B.

According to the embodiment, machining is performed through location between the bearing support 52 and the shell 6 and in a state where the combined body B is formed, the mounting precision of the bearing is ensured through the machining precision of the combined body B, and a perpendicularity between the through hole 522 and the end face A is ensured through one-time location and clamping.

In some embodiments, as shown in FIG. 5, two bearing supports 52 are arranged in the shell 6 at intervals along the axial direction and are configured to support two different positions of the main shaft 1; and through holes 522 of the two bearing supports 52 are configured to be machined to a preset size in a state where the two bearing supports 52 and the shell 6 are assembled into a combine body B.

According to the embodiment, machining is performed through location between the two bearing supports 52 and the shell 6 and in a state where the combined body B is formed, and the two through holes 522 are machined sequentially from one side of the combined body B, such that the size and coaxiality of the two through holes 522 can be ensured through one-time location and clamping.

Since each key part on the bearing support 52 is machined in one location and clamping process, the coaxiality of the two through holes 522 and the perpendicularity of the through hole 522 corresponding to each bearing support 52 and the end face A may be improved, thus ensuring the coaxiality of the two radial bearings 8 and the perpendicularity of the thrust bearings and improving the working stability of a rotor system. Through actual measurement, the bearing supporting assembly provided by the present disclosure is capable of increasing the coaxiality of the two radial bearings 8 and the perpendicularity of the radial bearings 8 and the thrust bearings to within 5 microns.

The specific machining method of the bearing supporting assembly is described below. During machining, two bearing supports 52 are subjected to first location through a spigot 527 and cooperate with a shell 6, a flange disk 525 and the shell 6 are fixed through a fastener, and a pin 11 is punched for fixation. Then, the shell 6 and the two bearing supports 52 serving as a combined body B are located on machining equipment, and an end face A, cooperating with fixing plate 51, of the two bearing support 52 is machined to ensure a perpendicularity of thrust bearings and radial bearings 8, and through holes 522 of the two bearing supports 52 are machined sequentially from one side to ensure the coaxiality of the two radial bearings 8.

After machining, the bearing supports 52 are disassembled, the radial bearings 8 are mounted into the through holes 522 of the bearing supports 52 through a hot mounting manner, and then the fixing plates 51 are mounted at first ends of the bearing supports 52. Then, the bearing supports 52 on which the fixing plates 51 are mounted are fixed on the shell 6, and the bearing supports 52 are located through the spigot 527 and the position of the pin 11 determined during machining.

If each bearing adopts a dynamic pressure gas bearing, since the bearing has high machining precision and requires extremely high precision on an assembling position, if the assembling precision is reduced, the performance of the bearing will be reduced, and in severe cases, the main shaft 1 will not be able to float; and when two or more dynamic pressure radial bearings are adopted, the coaxiality of the bearings is required to be in a micron level, and the perpendicularity of all thrust surfaces relative to the center of the main shaft 1 is required to be in the micron level. According to the method provided by the present disclosure, the through holes 522 of the two bearing supports 52 and the end faces A are machined in one location and clamping process, such that the machining precision and the subsequent assembling precision may be improved.

Secondly, the present disclosure provides a machining method of the bearing supporting assembly based on the above embodiments. referring to FIG. 5, in some embodiments, the machining method includes:

Step 101: assembling the bearing support 52 and the shell 6 into a combined body B;

Step 102: locating and clamping the combined body B on machining equipment, for example, the machining equipment is a machine tool, etc.; and Step 103: machining the through hole 522 of the bearing support 52 and an end face A for mounting a fixing plate 51 to a preset size through one-time location and clamping.

According to the embodiment, machining is performed through location between the bearing support 52 and the shell 6 and in a state where the combined body B is formed, the mounting precision of a bearing may be ensured through the machining precision of the combined body B, and a machining perpendicularity between the through hole 522 and the end face A may be ensured through one-time location and clamping and by using a uniform machining standard so as to ensure a perpendicularity of a radial bearing 8 and a thrust bearing.

In some embodiments, two bearing supports 52 are arranged in the shell 6 at intervals along the axial direction. After the two bearing supports 52 and the shell 6 are assembled into the combined body B through the Step 101, machining the through hole 522 of the bearing support 52 includes:

Step 104: machining the through holes 522 of the two bearing supports 52 to the preset size through one-time location and clamping.

The performing sequence of the Step 104 and the Step 103 are not limited. In actual machining, the two through holes 522 and end faces A are finely machined in on location and clamping process according to the convenience of machining.

According to the embodiment, machining is performed through location between the two bearing supports 52 and the shell 6 and in a state where the combined body B is formed, and the mounting precision of the bearing may be ensured through the machining precision of the combined body B; moreover, a uniform machining standard may be adopted through one-time location and clamping, and the size and coaxiality of the two through holes 522 may be ensured through one-time location and clamping.

In some embodiments, the Step 104: through holes 522 of the two bearing supports 52 are machined to a preset size through one-time location and clamping specifically includes: the through holes 522 of the two bearing supports 52 are sequentially machined to the preset size from one side of the shell 6.

For example, the through holes 522 are machined through boring, and a machining tool sequentially machines the two through holes 522 from one side of the shell 6 through axial feeding, such that the machining efficiency may be improved, and the coaxiality of the two through holes 522 is further improved.

In some embodiments, a spigot 527 is formed at one end, connected to the shell 6, of the bearing support 52. The Step 101: a bearing support 52 and a shell 6 are assembled into a combined body B specifically includes:

Step 101A: assembling the bearing support 52 and the shell 6 through the spigot 527 to perform first location;

Step 101B: fixing the bearing support 52 and the shell 6 through a fastener; and Step 101C: after fixing the flange disk 525 of the bearing support 52 and the shell 6, punching a pin 11 to perform second location.

In this embodiment, the Steps 101 to 103 are performed sequentially.

After primary location through the spigot 527, a position relationship between the bearing support 52 and the shell 6 is restrained through the fasteners, the bearing support 52 and the shell 6 are matched to punch a pin hole on the basis of the original first pin hole 528 to form a second pin hole 61 in the shell 6, and the pin 11 is sequentially inserted into the first pin hole 528 and the second pin hole 61, such that through location of the pin 11, position change of the bearing support 52 and the shell 6 caused by a large cutting force in the machining process can be avoided, and accurate location can be provided for the subsequent product assembling process. The mounting precision of the bearing support 52 in the shell 6 may be accurately ensured through double location, such that the position precision between the radial bearing 8 and the thrust bearing is improved.

In some embodiments, after machining, the machining method further includes:

step 105: disassembling the combined body B formed by assembling the bearing support 52 and the shell 6, so as to mount the radial bearing 8 in a state where the bearing support 52 is separated from the shell 6.

After machining, the bearing support 52 is disassembled, the radial bearing 8 is mounted into the through hole 522 of the bearing support 52 through a hot mounting manner, and then the fixing plate 51 is mounted at the first end of the bearing support 52. The bearing support 52 may be fixedly mounted on the shell 6 through the position of the pin 11 determined during machining. The bearing support 52 ensures the assembling precision of the bearing and improves the stability of the rotor system through double location of the spigot 527 and the pin 11.

Finally, the present disclosure further provides a centrifugal compressor, including the bearing supporting assembly according to the above embodiments. In addition, the bearing supporting assembly provided by the present disclosure may be applied to a screw type refrigeration compressor, etc.

The working principle of the centrifugal compressor is: in the working process of the compressor, a main shaft 1 rotates at a high speed, gas enters a diffuser 3 after being accelerated by an impeller 2 on the left side, the gas enters a first volute after being pressurized through primary compression by the diffuser 3, an exhaust channel in the first volute guides the compressed gas into an impeller 2 on the right side, the gas enters a diffuser 3 on the right side after being centrifuged by the impeller 2 on the right side, the gas enters a second volute after being subjected to secondary compression, and the gas is discharged out of the compressor through an exhaust channel in the second volute.

As shown in FIG. 1, the centrifugal compressor provided by the present disclosure further includes: a main shaft 1, a diffuser 3, a thrust disk 4 and a second thrust bearing 10, wherein the thrust disk 4 is fixed with the main shaft 1 and is configured to rotate together with the main shaft 1, the thrust disk 4 is located between the diffuser 3 and the fixing plate 51 along the axial direction. A first thrust bearing 10' is arranged at one end, away from the bearing support 52, of the fixing plate 51; and the second thrust bearing 10 is arranged at one end, away from a diffusion surface, of the diffuser 3, that is, the second thrust bearing 10 is arranged at one end, close to the fixing plate 51, of the diffuser 3. Specifically, the thrust disk 4 is provided with a thrust portion 41, and left and right surfaces of the thrust portion 41 and the thrust bearings on the two sides form working surfaces, which may withstand bidirectional axial forces, thus ensuring stable and reliable operation of the compressor under full working conditions and during reverse rotation.

In the centrifugal compressor of the embodiment, the thrust disk 4 cooperates with the thrust bearings on the two sides, which may bear axial forces in left and right directions, thus ensuring the operation stability of the centrifugal compressor under full working conditions and during reverse rotation. The operation working conditions of the compressor refer to an evaporation temperature and a condensation temperature of a system where the compressor is located. The full working conditions refer to that the compressor works within a certain evaporation temperature range and a condensation temperature range. When the compressor is shut down, since an exhaust pressure is higher than a suction pressure, the compressor will rotate reversely after shutdown.

In some embodiments, there are a clearance between one side of the thrust disk 4 and the first thrust bearing 10' and a clearance between the other side and the second thrust bearing 10, and the clearances at two sides of the thrust disk 4 are limited through mutual abutting of the diffuser 3 and the fixing plate 51.

For example, at least one of the first thrust bearing 10', the second thrust bearing 10 and the radial bearing 8 is a static pressure or dynamic pressure gas thrust bearing, or a magnetic levitation bearing.

By taking FIG. 1 as an example, since there is a clearance between the thrust bearing and the thrust disk 4, gas will form a gas film with a pressure in the clearance for thrusting and lubricating. Since the thrust bearing itself is in a cavity of the compressor and the cavity is full of the gas, the gas may be brought into the clearance to form a dynamic pressure gas thrust bearing in the rotation process of the main shaft 1.

The fixing plate 51 and the diffuser 3 abut against each other for combined limitation, thus limiting the position of the thrust disk 4 and the clearance between the thrust bearings on the two sides. Therefore, the clearance between the thrust bearings may be accurately ensured, the assembling difficulty is reduced, the assembling efficiency and the assembling precision are improved, and the working performance of the compressor is improved, thereby improving the operation stability of the compressor.

In some embodiments, the thrust disk 4 further includes a connection portion 42, wherein the connection portion 42 is connected to the thrust portion 41 and sleeves the main shaft 1; a second groove 31 is formed at one end, close to the fixing plate 51, of the diffuser 3 along the axial direction; a through hole is formed at the bottom of the second groove 31; and the connection portion 42 is arranged into the through hole. The connection portion 42 is in interference fit with the main shaft 1, such that the thrust disk 4 may rotate together with the main shaft 1. The diffuser 3 and the fixing plate 51 are fixedly arranged, and there is a clearance between the diffuser 3 and the main shaft 1. For example, the thrust disk 4 has a cylindrical stepped structure.

In some embodiments, still referring to FIG. 1, a second groove 31 is formed at one end, away from a diffusion surface, of the diffuser 3, that is, the second groove 31 is formed at one end, close to a fixing plate 51, of the diffuser 3, a first thrust bearing 10' is arranged at the bottom of the second groove 31 along an axial direction, the fixing plate 51 and the diffuser 3 are fixed, and a thrust portion 41 of a thrust disk 4 is located in the second groove 31.

Since the bearing support 52 needs to be fixed on the shell 6 of the compressor, the position of the bearing support 52 is fixed, and the fixing plate 51 may be axially located. Moreover, the diffuser 3 is fixed on the shell 6, and the diffuser 3 and the fixing plate 51 abut against each other, such that the clearance between the thrust bearings on two sides can be accurately ensured through an axial depth of the second groove 31, the assembling precision may be improved, the assembling difficulty is reduced, the assembling efficiency is improved, the performance of the thrust bearing can be ensured, and reduction, even failure of the performance of the thrust bearing caused by inaccurate clearance control is avoided, thus improving the operation stability of the compressor.

As shown in FIG. 1, a depth of the second groove 31 includes: a thickness of the thrust portion 41, a thickness of the thrust bearings on two sides and a working clearance of the thrust bearings on the two sides; therefore, to ensure the working clearance of the thrust bearings on the two sides, the clearance may be controlled by increasing the depth of the second groove 31, the thickness of the thrust portion 41 and the thickness of the thrust bearings on the two sides. The specific method is: a design depth and a tolerance range of the second groove 31 are derived according to a clearance range which the thrust bearings need to reach, a thickness tolerance range of the thrust portion 41 and a thickness tolerance range of the thrust bearings. Therefore, the working clearances of the thrust bearings may be ensured by improving the machining precision of the depth of the second groove 31, the assembling precision may be improved and the assembling difficulty is reduced, thus improving the assembling efficiency.

In some embodiments, the first thrust bearing 10' is directly fixed at the bottom of the second groove 31. According to the structure, the diffuser 3 and the fixing plate 51 of the thrust bearing are integrated into a part, and the bottom of the second groove 31 may serve as the fixing plate of the second thrust bearing 10 without additionally setting the fixing plate 51 of the thrust bearing, such that an axial size of the bearing supporting assembly may be further reduced and the structure is more compact.

In some embodiments, referring to FIG. 1, a first thrust bearing 10' is fixed on a fixing plate 51 through a fastener, a second thrust bearing 10 is fixed on a diffuser 3 through the fastener, the fixing plate 51 and the diffuser 3 are fixed through the fastener, and a locating spigot is formed at the periphery of the diffuser 3, thereby facilitating location and mounting of a shell 6.

The bearing supporting assembly and the machining method thereof, and the centrifugal compressor, which are provided by the present disclosure, are described above in detail. The principle and embodiments of the present disclosure are elaborated by specific embodiments, and the description of the above embodiments is only intended to help understand the method of the present disclosure and the core concept thereof. It should be noted that those skilled in the art may also make several improvements and modifications without departing from the principles of the present disclosure which should fall within the protection scope of the claims of the present disclosure.

The invention claimed is:

1. A bearing supporting assembly, comprising:
a bearing support, provided with a through hole;
a fixing plate, detachably mounted at one end of the bearing support along an axial direction of the through hole;
a radial bearing, mounted in the through hole;
a first thrust bearing, mounted on a side, away from the bearing support, of the fixing plate; and
a shell;
wherein a first end of the bearing support is connected to the fixing plate, a second end of the bearing support is connected to the shell, and a radial outline dimension of the bearing support increases from the first end to the second end thereof.

2. The bearing supporting assembly according to claim 1, wherein the fixing plate is configured to limit a displacement of the radial bearing along the axial direction.

3. The bearing supporting assembly according to claim 1, wherein a locating ring is arranged at one end, facing towards the bearing support, of the fixing plate, the bearing support is provided with an annular first groove, the locating ring is arranged into the first groove, and an inner wall of the locating ring engages with an outer wall of a partial length section of the radial bearing.

4. The bearing supporting assembly according to claim 1, wherein the bearing support comprises a spigot formed at one end that is in contact with the shell, the spigot acts to position the bearing support within the shell.

5. The bearing supporting assembly according to claim 4, further comprising a pin positioned in a first pin hole of the bearing support and a second pin hole of the shell.

6. The bearing supporting assembly according to claim 1, wherein the bearing support is provided with a vent hole configured to communicate a space where the radial bearing is located with a space where the first thrust bearing is located.

7. A centrifugal compressor, comprising a bearing supporting assembly according to claim 1.

8. The centrifugal compressor according to claim 7, further comprising: a main shaft, a diffuser, a thrust disk and a second thrust bearing, wherein the thrust disk is configured to rotate together with the main shaft and is located between the diffuser and the fixing plate along the axial direction; and
the first thrust bearing is arranged at one end, away from the bearing support, of the fixing plate, and the second thrust bearing is arranged at one end, facing the fixing plate, of the diffuser.

9. The centrifugal compressor according to claim 8, wherein a clearance between one side of the thrust disk and the first thrust bearing and a clearance between the other side of the thrust disk and the second thrust bearing are limited by the diffuser and the fixing plate;
wherein a second groove is formed at one end, facing the fixing plate, of the diffuser, the second thrust bearing is arranged at the bottom of the second groove along an axial direction, and the thrust disk is located in the second groove.

10. The centrifugal compressor according to claim 8, wherein at least one of the first thrust bearing, the second thrust bearing and the radial bearing is an air-suspending bearing.

11. A machining method of a bearing supporting assembly according to claim 1, comprising:
assembling the bearing support and a shell into a combined body;
locating and clamping the combined body on machining equipment; and
machining the through hole of the bearing support and an end face for mounting the fixing plate to a preset size through one-time location and clamping.

12. The machining method according to claim 11, wherein assembling the bearing support and the shell into the combined body comprises attaching two bearing supports to the shell, the two bearing supports are arranged in the shell at intervals along the axial direction, and after the two bearing supports and the shell are assembled into the combined body, machining the through holes of the bearing supports comprises:
machining the through holes of the two bearing supports to the preset size through one-time location and clamping.

13. The machining method according to claim 12, wherein the step of machining the through holes of the two bearing supports to a preset size through one-time location and clamping comprises:
sequentially machining the through holes of the two bearing supports to the preset size from one side of the shell.

14. The machining method according to claim 11, wherein a spigot is formed at one end, connected to the shell, of the bearing support; and the step of assembling the bearing support and the shell into the combined body comprises:
assembling the bearing support and the shell through the spigot, and after assembling, punching a pin to connect the bearing support and the shell.

15. The machining method according to claim 11, wherein after machining, the machining method further comprises:
disassembling the combined body formed by assembling the bearing support and the shell, so as to mount the radial bearing in a state where the bearing support is separated from the shell.

* * * * *